United States Patent [19]

Birnbaum

[11] 4,328,942
[45] May 11, 1982

[54] DISPLAY PEDESTAL

[76] Inventor: Betty Birnbaum, 11 Fifth Ave., New York, N.Y. 10003

[21] Appl. No.: 32,232

[22] Filed: Apr. 23, 1979

[51] Int. Cl.³ .............................................. F16M 13/00
[52] U.S. Cl. .................................... 248/558; 248/146; 248/349; 248/362; 431/289
[58] Field of Search ............... 248/146, 346, 349, 362, 248/363, 558; 431/292, 297, 289

[56] References Cited

U.S. PATENT DOCUMENTS

| | | | |
|---|---|---|---|
| 893,210 | 7/1908 | Weeks | 248/349 X |
| 2,042,548 | 6/1936 | Peters | 248/362 X |
| 2,963,256 | 12/1960 | Borah | 248/362 X |
| 3,101,566 | 8/1963 | Stiller | 248/362 X |
| 3,879,005 | 4/1975 | Flick | 248/362 X |
| 3,932,113 | 1/1976 | Thrush | 431/297 |

FOREIGN PATENT DOCUMENTS 3359 of 1911 United Kingdom ................ 248/362

*Primary Examiner*—William H. Schultz
*Attorney, Agent, or Firm*—Davis, Hoxie, Faithfull & Hapgood

[57] ABSTRACT

A pedestal comprising a body having opposite faces, each of predetermined area and lying in a plane which is substantially parallel with the plane of the other face the body narrowing from the predetermined area of each face to a central waist portion of minimum cross sectional area in a plane taken parallel to the said planes of the opposite faces, and a plurality of suction cups secured to and protruding from one of said faces, whereby when said pedestal is used as a support for another object the face to which said suction cups are secured may be disposed uppermost to afford vacuum grip with the object supported by said pedestal or selectively may be disposed lowermost to afford vacuum grip with the surface on which said pedestal rests.

4 Claims, 12 Drawing Figures

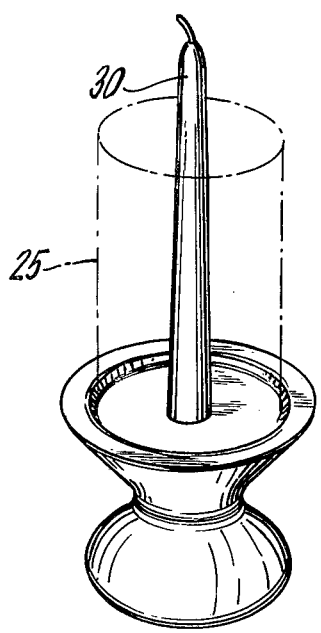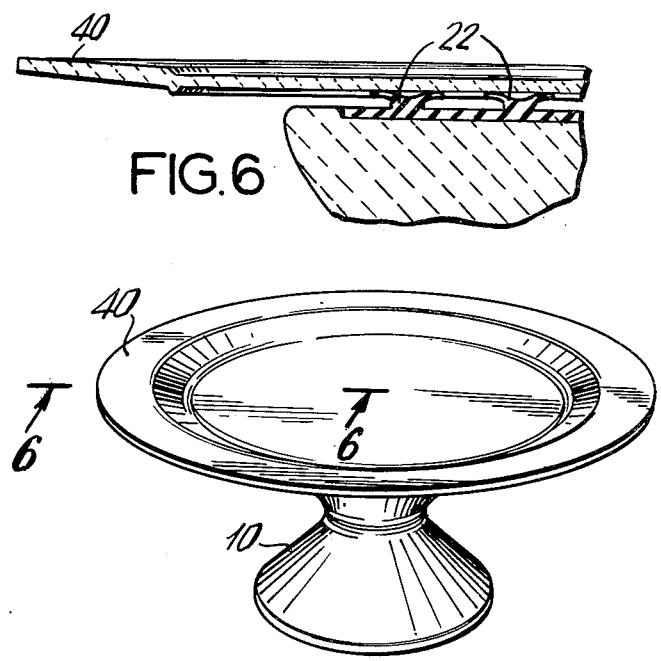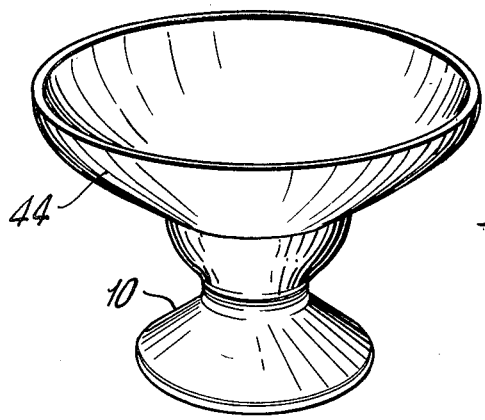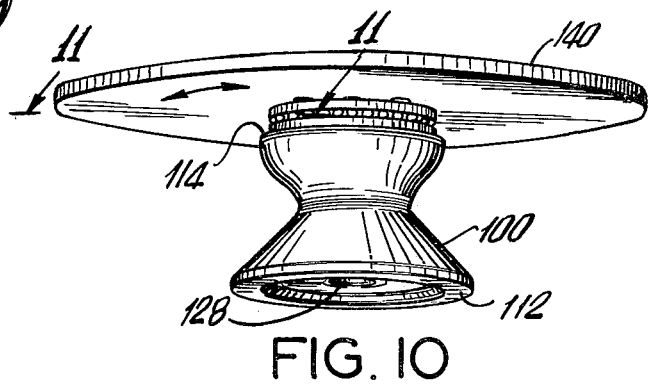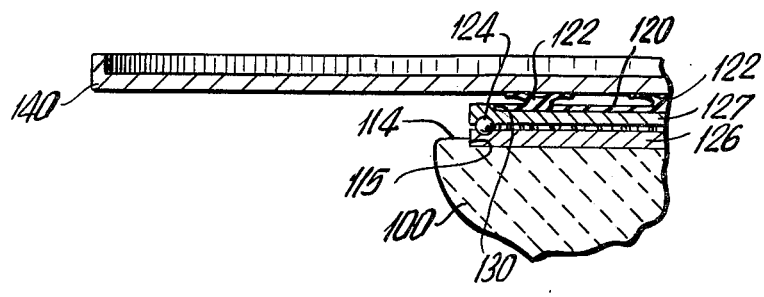

U.S. Patent May 11, 1982 Sheet 3 of 3 4,328,942
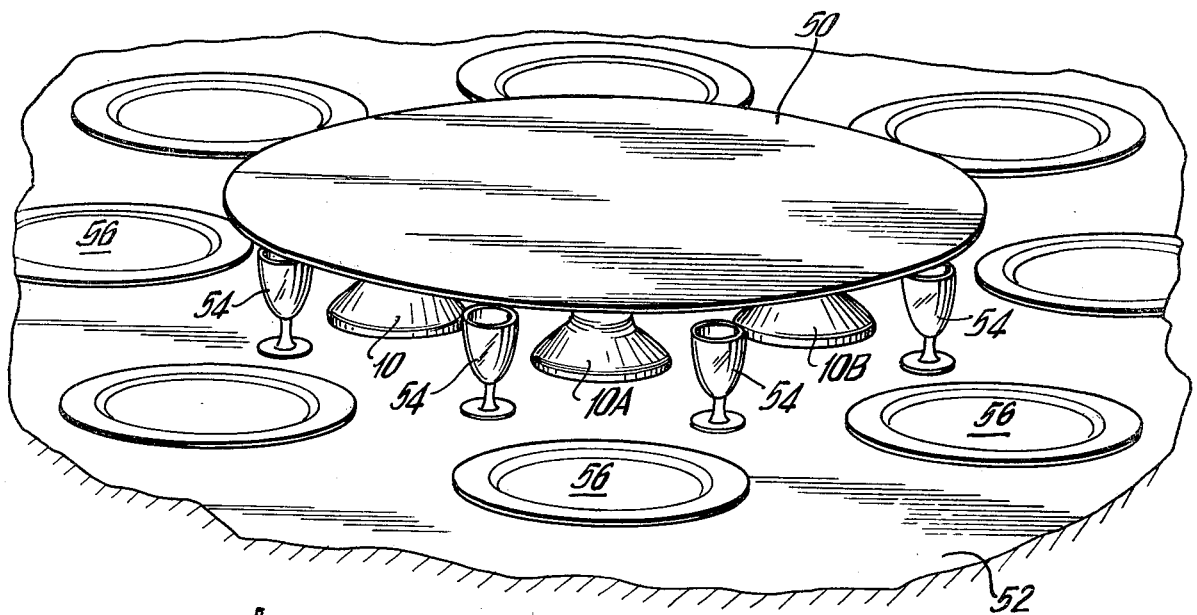
FIG. 8
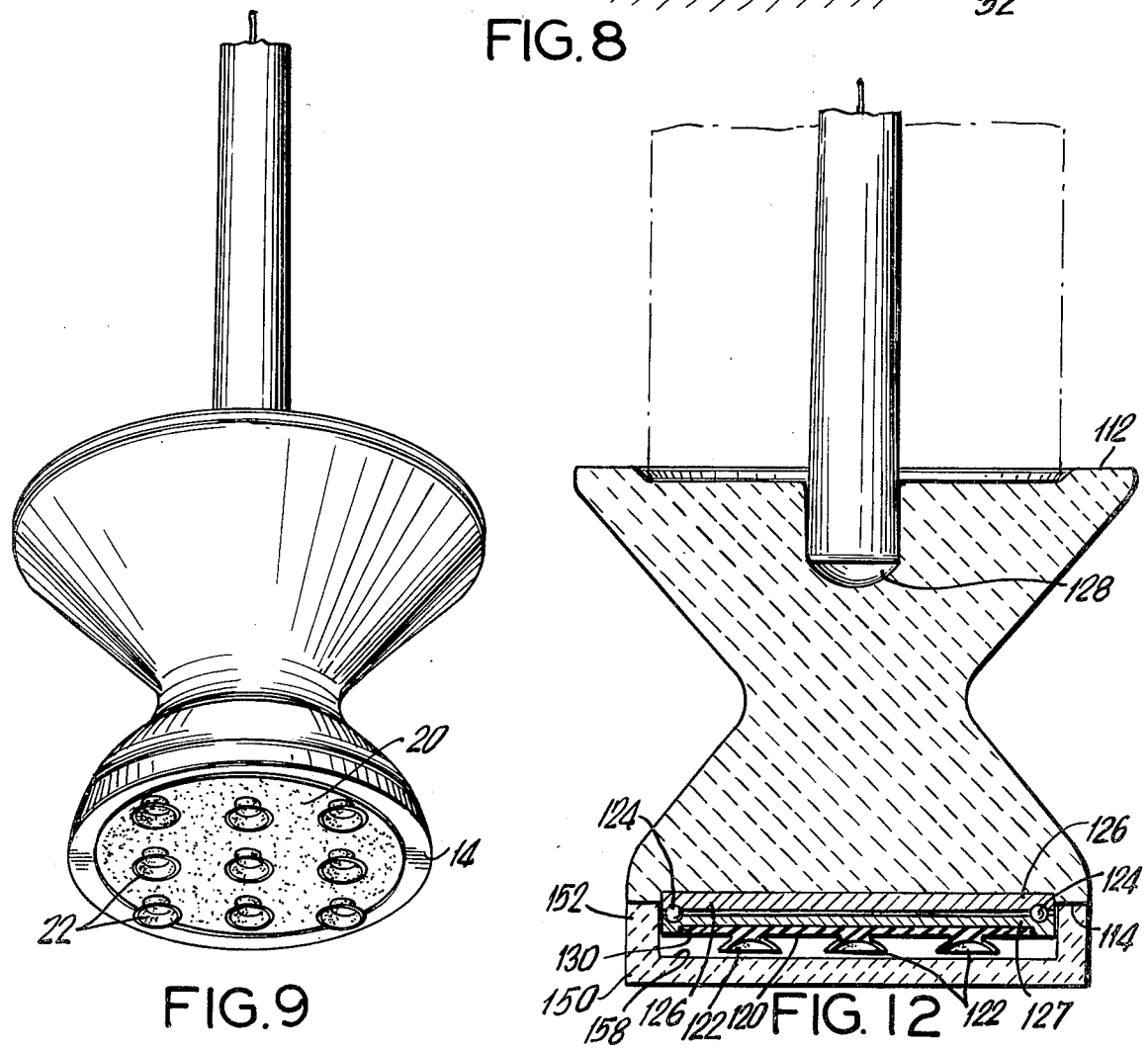
FIG. 9
FIG. 12

DISPLAY PEDESTAL

This invention relates to a pedestal of a type especially adapted for the display in elevated position of an article such as a bowl, plate, platter or similar ware. Although my novel pedestal is useful for commercial display as in store windows or on tables or counters, it is intended especially for use in the home for display in the dining room as part of the table or sideboard setting or in the living or other room in the home. A graceful, aesthetic display of such containers at different levels can contribute substantially to the elegance of the table setting for which a housewife strives while serving the utilitarian purpose of affording an easily accessible container. It is the primary object of the present invention to enable the housewife to dispose any piece of, e.g. chinaware, she owns in elevated display position by means of my novel pedestal. To that end, the pedestal itself is gracefully contoured to harmonize with fine ware and is fashioned of a height to perform its desired display function. The pedestal comprises, in combination, a supporting face of sizeable area disposed lowermost to afford stability coupled with an opposite upper face presenting vacuum cup means to which the ware can be secured to obviate slippage or capsizing. Preferably the upper face is of smaller diameter than the lower face, for a more graceful contour in profile, and the vacuum cup means assures stability of the wear on the upper face despite its said smaller diameter.

In the drawings:

FIG. 4 is a perspective view of the pedestal used as a candle holder;

FIG. 5 is a perspective view of the pedestal used as a plate support;

FIG. 6 is a vertical section on the plane 6—6 of FIG. 5;

FIG. 7 is a perspective view of the pedestal supporting a bowl;

FIG. 8 is a perspective view of an arrangement of pedestals for supporting a plurality of dinnerware objects;

FIG. 9 is a perspective view showing the vacuum-cupped lower surface when the pedestal is in the candle holding position of FIG. 1;

FIG. 10 is a perspective view of a lazy Susan embodiment of my novel pedestal as a further indication of its versatility;

FIG. 11 is a vertical section on the plane 11—11 of FIG. 10, and

FIG. 12 is a central vertical section of the embodiment of FIGS. 10 and 11 but in inverted position disposed on a supporting chamber and used as a candle holder.

Figure 1:
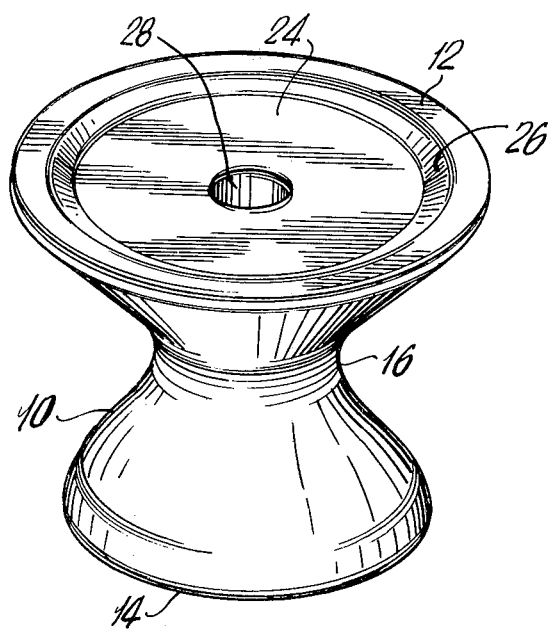
FIG. 1 is a perspective view of my novel pedestal showing its candle holding face disposed uppermost.
Figure 2:
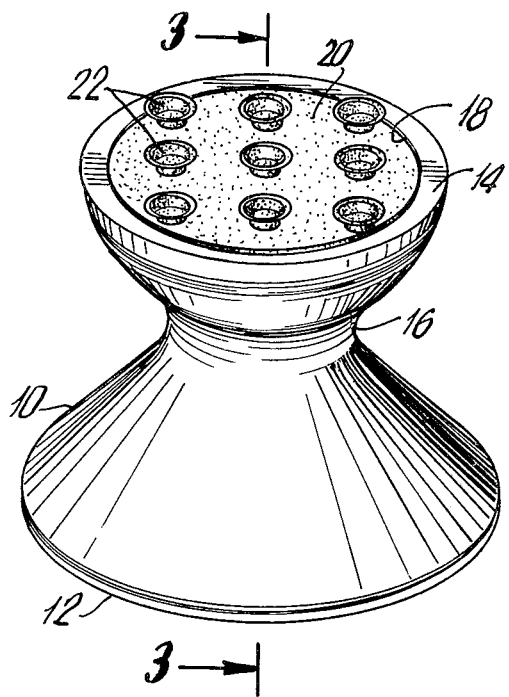
FIG. 2 is a perspective view of the pedestal with its vacuum cup gripping surface disposed uppermost.
Figure 3:
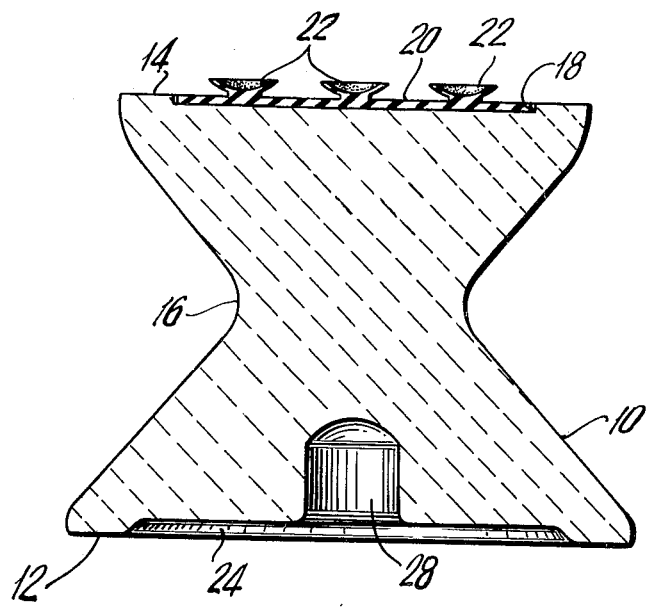
FIG. 3 is a vertical section taken on the plane 3—3 of FIG. 2.

Referring to FIGS. 1, 2 and 3, the pedestal comprises a body 10 having a face 12 and an opposite face 14. The face 12 is of predetermined area and lies in a plane which is parallel to the plane of the face 14, likewise of predetermined area desirably slightly less than the area of face 12. The body of the pedestal narrows after the fashion of an hourglass from each face toward a central waist portion 16 of minimum cross sectional area in a plane taken parallel to the planes of the faces 12 and 14. Desirably, the opposite faces 12 and 14 are circular in plan view and the body portion extending from each face toward the waist portion 16 is in the form of the frustum of a cone, although my invention is not to be so limited except as the appended claims require.

The face 14 is recessed at 18 to receive a conformingly shaped mat 20 of natural or synthetic rubber having a plurality (nine are illustrated) or resilient vacuum cups 22. The face 12 is recessed at 24 to form an annular outer rim 26. At its central portion the face 12 is recessed at 28 for the reception of a candle such as shown at 30 in FIG. 4. As also shown in that view, there may be disposed in the recess 26 of face 12 a chimney 25 suitably of glass, after the fashion of a hurricane lamp.

If the pedestal 10 is disposed with its surface 14 uppermost and its surface 12 lowermost, it may be used to support a plate 40 as shown in FIGS. 5 and 6. The vacuum cups 20 against which the plate 40 is pressed, preferably after moisture is applied to the cups, secure the plate 40 against slippage in elevated position, supported on the pedestal 10. The base surface 12 of greater surface area than the upper surface 14 not only imparts steadiness to the assemblage, even when the plate 40 carries objects such as fruit tending to raise the center of gravity, but also by its graceful lines is pleasing to the eye. These considerations are especially true when the plate is substituted by a bowl such as is shown at 44 in FIG. 7. The substitution of bowl for plate is typical of a wide range of interchangeability of the element being supported.

By placing a tray or large platter 50 (FIG. 8) in position supported by a plurality of pedestals (of which three are shown at 10, 10A and 10B and a fourth is not shown) all at the same height, arranged in suitable supporting arrangement on table 52, such as at the corners of a square, a second table level is created. Pieces such as glasses 54, serving dishes (not shown), etc., can be set under the elevated surface at table level inside the arrangement of dinner plates 56. The upper surface of tray 50 is adapted to receive any objects desired and, thus, I have increased considerably the available supporting surface area of the table.

A desirable modification of my invention is shown in FIGS. 10 to 12. There, the pedestal 100 may be in all respects identical with the pedestal 10, including its hourglass shape and recessed candle holding face 112 having candle receiving cavity 128, except that it differs in the construction of the opposite face designated 114. The face 114 is recessed at 115 to receive one of a pair of circular concentric plates 126, the other of which, shown at 127, is spaced slightly from plate 126, the plates being conformingly grooved to form a race for a plurality of ball bearings 124. Plate 126 is immovably fixed in recess 115. Plate 127 is recessed at 130 to receive a conformingly shaped mat 120, which may be identical to the mat 20 of the earlier embodiment and presents a plurality of resilient vacuum cups 122. The mat 120 is immoveably secured in the recess 130. By this arrangement a lazy Susan is afforded. Plate or other ware 140, securely mounted on vacuum cups 122, may freely rotate about the axis of the pedestal on ball bearings 124.

In the event the pedestal of the lazy Susan embodiment is desired to function alternatively as candle holder, a base 150 (FIG. 12) may be provided. The base is dish shaped having an upturned circular rim 152 of an outer diameter conforming to the outer diameter of base 114. The inner diameter of the rim is slightly greater than the diameter of plate 127 and the depth to the inner surface 158 of the dish is adequate to receive with clearance the cups 122. In this way the pedestal is kept from rotating on ball bearings when it functions as a candle holder. The dish 152, when not so in use, may conveniently serve other functions, such as providing an ash tray or the like.

In the embodiment illustrated in FIG. 9, when the vacuum cups 22 are disposed lowermost, they may function to grip the supporting surface to avoid displacement of the candle holder as by tipping. Indeed the assembly of FIG. 5 with vacuum caps uppermost securing a platter may, as a unit, be inverted, disposing the candle receiving recess 28 uppermost to afford an attractive and highly stable candle holder. Thus the parts can be used in this way rather than simply being stored when the pedestal form is not in use.

I claim:

1. A pedestal comprising a body comprising opposite faces, each of predetermined area and lying in a plane which is substantially parallel with the plane of the other face, the body narrowing after the fashion of an hourglass from the predetermined area of each face to a central waist portion of minimum cross sectional area in a plane taken parallel to the said planes of the opposite faces, one of said faces being of sizeable area and adapted to be disposed either lowermost to afford stability or uppermost to serve as a candle holder by means of a candle receiving orifice in said one of said faces, and a plurality of suction cups secured to and protruding from the other of said faces, whereby when said pedestal is used as a support for another object the said other of said faces may be disposed uppermost to afford vacuum grip with the object supported by said pedestal and whereby when said pedestal is used as a candle holder the said other of said faces may be disposed lowermost to grip the supporting surface.

2. A pedestal comprising a body comprising opposite faces, each of predetermined area and lying in a plane which is substantially parallel with the plane of the other face, the body narrowing after the fashion of an hourglass from the predetermined area of each face to a central waist portion of minimum cross sectional area in a plane taken parallel to the said planes of the opposite faces, one of said faces being of sizeable area and adapted to be disposed lowermost to afford stability, and a plurality of suction cups secured to and protruding from the other of said faces, whereby when said pedestal is used as a support for another object the said other of said faces may be disposed uppermost to afford vacuum grip with the object supported by said pedestal, and wherein ball bearing means are interposed between said other of said faces and said suction cups whereby the object so vacuum gripped may rotate freely about the axis of the pedestal.

3. The pedestal of claim 2 which also includes a dish shaped element for supporting said pedestal with said suction cups lowermost out of contact with the surface on which the pedestal is supported.

4. A pedestal comprising a body comprising opposite faces, each with a flat, planar surface and each of predetermined area and lying in a plane which is substantially parallel with the plane of the other face, the body narrowing after the fashion of an hourglass from the predetermined area of each face to a central waist portion of minimum cross sectional area in a plane taken parallel to the said planes of the opposite faces, one of said faces being of sizeable area and adapted to be disposed lowermost to afford stability, and a plurality of suction cups secured to and protruding from the other of said faces, whereby when said pedestal is used as a support for another object the said other of said faces may be disposed uppermost to afford vacuum grip with the object supported by said pedestal and whereby the spacing between each face is such that, when said pedestal is used as a support for another object, the uppermost face is substantially elevated above the lowermost face so as to allow display of the supported object in elevated position.

* * * * *